United States Patent [19]

Yasuhara et al.

[11] 4,072,057
[45] Feb. 7, 1978

[54] DIFFERENTIAL PRESSURE CELL WITH DIAPHRAGM TENSION AND OVERPRESSURE PROTECTION

[75] Inventors: Takeshi Yasuhara; Mitsuru Tamai; Tadanori Yuhara, all of Kawasaki, Japan

[73] Assignee: Fuji Electric Co., Ltd., Kawasaki, Japan

[21] Appl. No.: 721,635

[22] Filed: Sept. 8, 1976

[30] Foreign Application Priority Data

Sept. 9, 1975 Japan .................... 50-109112

[51] Int. Cl.² ........................... G01L 7/08
[52] U.S. Cl. ...................... 73/718; 361/283
[58] Field of Search ......... 73/407 R, 398 C, 398 AR, 73/398 R; 361/283

[56] References Cited
U.S. PATENT DOCUMENTS

| 2,999,386 | 9/1961 | Wolfe ........................... 73/407 R |
| 3,400,588 | 9/1968 | O'Connor .................... 73/407 R |
| 3,712,143 | 1/1973 | Weaver et al. ............... 73/407 R |

*Primary Examiner*—Donald O. Woodiel

*Attorney, Agent, or Firm*—Sughrue, Rothwell, Mion, Zinn and Macpeak

[57] ABSTRACT

A differential pressure measuring cell includes a capacitive-type measuring chamber having a relatively rigid diaphragm, an auxiliary chamber having a relatively flexible diaphragm, a casing defining first and second recesses surrounding the auxiliary and measuring chambers, respectively, passages connecting one side of the auxiliary chamber and measuring chamber with the first recess and a first pressure-receiving chamber, and passages connecting the other side of the auxiliary chamber and measuring chamber with the second recess and a second pressure-receiving chamber. Radial expansion of the auxiliary and measuring chambers is prevented by the static counterpressures present in the first and second recesses. Over pressure protection is provided by the small volumes of the first and second pressure-receiving chambers and the greater flexibility of the auxiliary diaphragm, whereby the auxiliary diaphragm will absorb the entire pressure differential before the measuring diaphragm engages the walls of the measuring chamber.

8 Claims, 4 Drawing Figures

DIFFERENTIAL PRESSURE CELL WITH DIAPHRAGM TENSION AND OVERPRESSURE PROTECTION

BACKGROUND OF THE INVENTION

The present invention relates to a device for use in sensing pressure of a source of fluid or differential pressure between two sources of fluid.

The known devices for sensing pressures provide an arrangement such that two insulators are arranged opposite one another, with a sensing diaphragm mounted therebetween, and metal foils are attached to surfaces of the insulators. The surfaces are directed towards the sensing diaphragm to detect changes in the electrical capacitance between the sensing diaphragm and the metal foils produced when different pressures are exerted on the opposite sides of the sensing diaphragm.

FIG. 1 shows a known pressure sensing device of the type generally described above, including an overpressure protection function. The device is described in detail in Frick U.S. Pat. No.3,618,390, issued Nov. 9, 1971 corresponding to Japanese Patent Publication No. 23916/1974. The device essentially comprises a pressure sensing portion 10, a first cover portion 11, and a second cover portion 12. The first cover portion 11 and second cover portion 12 are secured to the pressure sensing portion 10 by means of screws or the like, not shown. The first cover portion 11 is provided with a first pressure chamber 13, into which a fluid at pressure $P_1$ is inlet through a first introducing port 15. Also, the second cover portion 12 is provided with a second pressure chamber 14, into which a fluid at pressure $P_2$ is introduced through a second pressure inlet port 16. A differential pressure between the pressures $P_1$ and $P_2$ is sensed by the pressure sensing portion 10.

This pressure sensing portion 10 essentially comprises a metal housing 17, a ring 31, and a stop ring 34. The metal housing 17 consists of metal portions 17A and 17B each formed with a cavity, which is filled with an insulating material 18, 19 such as glass or ceramics. The insulating materials 18 and 19 have their facing surfaces ground into dish shaped surfaces, to which metal foil 25, 26 are applied respectively. A sensing diaphragm 22 is arranged between the metal portions 17A and 17B, such that the sensing diaphragm 22 and the insulating material 18 form a first sensing chamber 20, and the sensing diaphragm 22 and the partially spherical surface of the insulating material 19 form a second sensing chamber 21. The sensing diaphragm 22 has its peripheral end portion welded to the metal portions 17A and 17B. The sensing diaphragm 22 is made of metal, and when the sensing diaphragm 22 is one capacitor plate, the metal foils 25 and 26 are other capacitor plates. Further, the metal portion 17A is provided with a first pressure receiving or isolation diaphragm 27, and the pressure $P_1$ introduced into the first pressure chamber 13 acts on diaphragm 27. The metal portion 17A and the first pressure receiving diaphragm 27 form a first pressure receiving chamber 29, which communicates with the first sensing chamber 20 via openings formed within a ceramic tube 23. Likewise, the metal portion 17B is provided with a second pressure receiving or isolation diaphragm 28, and the pressure $P_2$ introduced into the second pressure chamber 14 acts on the second pressure receiving diaphragm 28. The metal portion 17B and the second pressure receiving diaphragm 28 form a second pressure receiving chamber 30, which communicates with the second sensing chamber 21 via openings formed within a ceramic tube 24. The first sensing chamber 20 and first pressure receiving chamber 29, and the second sensing chamber 21 and second pressure receiving chamber 30 are filled with non-compressive filler liquid such as silicone oil or the like, the ceramic tube 23 and 24 each serving as a liquid flow passage for the filler liquid.

The metal member 17A has an annular ring 32 fastened thereto so as to surround the first pressure receiving diaphragm 27, whereas the metal member 17B has an annular ring 33 fastened thereto so as to surround the second pressure receiving diaphragm 28. The annular ring 33 is welded to a large ring 31 which receives housing 17. A stop ring 34, which encircles the housing 17 and is fitted in a cavity provided in the ring 31, is retained in position by means of screws 35 which extend through holes formed in a shoulder of the ring 31.

Thus, the pressure $P_1$ introduced into the first pressure chamber 13 acts on the first pressure receiving diaphragm 27, and the pressure $P_2$ introduced into the second pressure chamber 14 acts on the second pressure receiving diaphragm 28 to deflect the sensing diaphragm 22 in response to the difference between the pressures $P_1$ and $P_2$, whereby deflection of the sensing diaphragm 22 will cause changes in electrical capacity between the sensing diaphragm 22 and the metal foils 25 and 26 as acting the capacitor plates. The changes in electrical capacity may be taken out through lead wires which as connected to metal foils 25 and 26 through housing 17 and insulators 18, 19 and which pass through conduit 36 to thereby sense differential pressure between pressures $P_1$ and $P_2$.

In the pressure sensing device constructed as above, volumes of the first and second pressure receiving chambers are selected so that the sensing diaphragm 22 will bottom against the metal foil 25 or 26 in response to overpressure at diaphragm 27 or 28 before the latter will bottom against the corresponding metal member 17A or 17B. This insures that the overpressure stop will be positive, and because the deposited capacitor plates 25, 26 are very stable due to the massive amount of glass fused into the housing 17, there is no shift in calibration.

The prior art devices, however, do exhibit certain drawbacks.

Firstly, there are changes in the span of sensing differential pressures due to static pressure. That is, the outer peripheral surface of the housing 17 is at atmospheric pressure, whereas the interior of the housing 17 is under very large static pressure (for example, 100 kg/cm²). This large static force tends to inflate the housing such that the interior sensing chambers become somewhat enlarged. The proportion, at which the interior of the housing 17 becomes larger, depends upon the magnitude of high static pressure acting on the first sensing chamber 20 and second sensing chamber 21. This enlargement of the housing 17 means that the sensing diaphragm 22 is tensioned radially so that it becomes hardened according to the tension. As a result, the diaphragm 22 responds differently to a given $P_1-P_2$ pressure differential than it would respond if it were under a different radial tension. This, of course, causes a change in electrical capacity between the sensing diaphragm and the metal foils 25, 26. For example, if in a first case the differential pressure $\Delta P$ is 1 kg/cm², the pressure $P_1$ is 49 kg/cm² and the pressure $P_2$ is 50 kg/cm² and in a second case the differential pressure $\Delta P$ is still 1 kg/cm², but the pressure $P_1$ is 99 kg/cm² and the pressure $P_2$ is 100 kg/cm$^2$, the greatly increased static pressure in the second case results in greater tension and hardening of diaphragm 22 with a resultant smaller deflection, despite the fact the $\Delta P$ is the same in both cases. Thus, the change in electrical capacity in the second case is smaller than that of the first case. For this reason, the pressure sensing device poses a problem such that the output signal span (i.e. change in electrical capacity) changes with the magnitude of static pressure acting on the first sensing chamber 20 and second sensing chamber 21.

Secondly, there is an occurrence of overpressure error. As previously mentioned, the overpressure may be prevented in the pressure sensing device by the provision of an arrangement such that the sensing diaphragm 22 impinges upon the metal foils 25 and 26 before the pressure receiving diaphragms 27 and 28 impinge upon the housing 17. However, if the sensing diaphragm 22 is brought into close contact with either of the ceramic tubes 23 and 24 by the action of overpressures, a part of the sensing diaphragm 22 facing the bores in the ceramic tubes 23 and 24 is forced into the bores. The greater the overpressures, the greater the part of the sensing diaphragm 22 which will be forced into the bores of the ceramic tubes 23 and 24. This causes a problem such that when the overpressures have been removed, the deflection of the diaphragm is not completely returned to its original state due to a residual stress. As a consequence, if the sensing operation should be continued in a condition where the diaphragm is deflected, it leads to an error in the output signal.

SUMMARY OF THE INVENTION

It is therefore an object of this invention to provide a differential pressure sensing cell of the type described which eliminates the two disadvantages noted above, that is, span change and measuring diaphragm tensioning due to static pressure and overpressure damage or deformation errors.

This object is fulfilled according to this invention by the provision of a differential pressure measuring cell including first and second input pressure chambers, pressure receiving diaphragms mounted therein, an auxilliary chamber having a relatively flexible diaphragm, and a measuring chamber having a relatively rigid diaphragm. Capacitor sensing foils line the opposite concave walls of the measuring chamber. A first input pressure $P_1$ is communicated, via one of the pressure receiving diaphragms, to one side of the auxilliary chamber, and via internal passages and a first cylindrical recess surrounding the auxiliary chamber, to one side of the measuring chamber. Similarly, a second input pressure $P_2$ is communicated, via the other pressure receiving diaphragm, to the other side of the measuring chamber, and via internal passages and a second cylindrical recess surrounding the measuring chamber, to the other side of the auxilliary chamber.

Radial pressure expansions of the auxilliary and measuring chambers, and consequent measuring errors due to the resultant diaphragm tensionings, are prevented by the static counterpressures present in the first and second cylindrical recesses surrounding the chambers. Overpressure protection is provided by the small volumes behind the pressure receiving diaphragms and the greater flexibility of the auxilliary diaphragm, whereby the pressure receiving diaphragms seat against their adjacent casings and the auxilliary diaphragm absorbs any excess pressure before the measuring diaphragm engages its chamber walls and becomes deformed thereby.

In an alternate embodiment, the capacitor foils may be replaced by inductance coils.

DETAILED DESCRIPTION OF THE PREFERRED EMBODIMENTS

This invention will now be described in detail by way of preferred embodiments thereof referring to the accompanying drawings.

Figure 2:
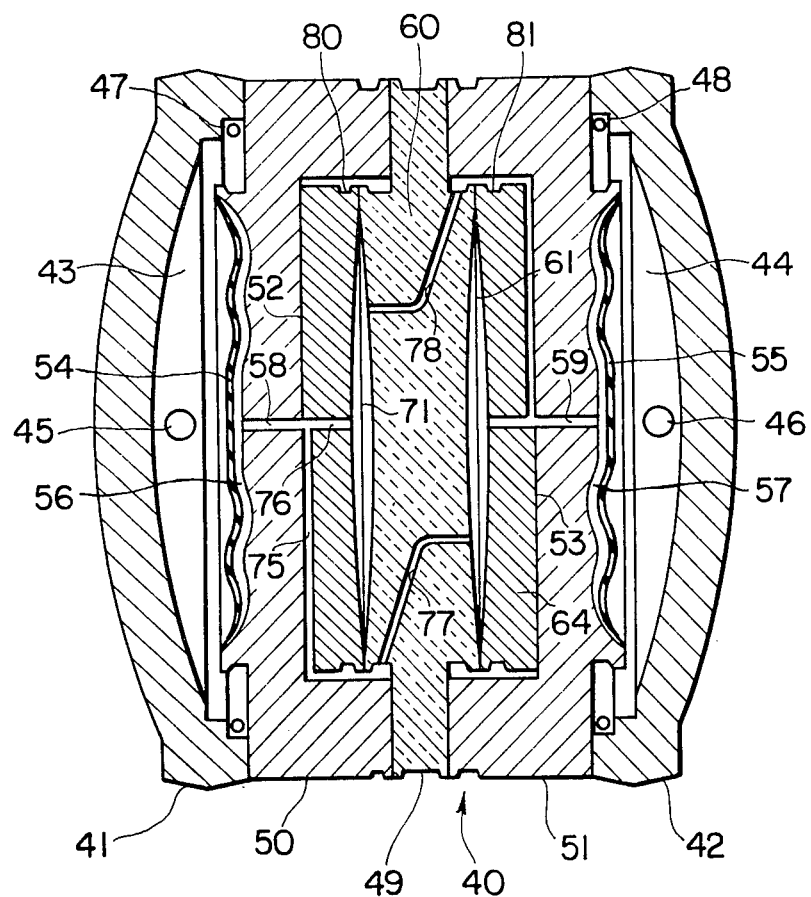
FIG. 2 shows a cross sectional view, partly in schematic, of a first preferred embodiment of this invention.
Figure 3:
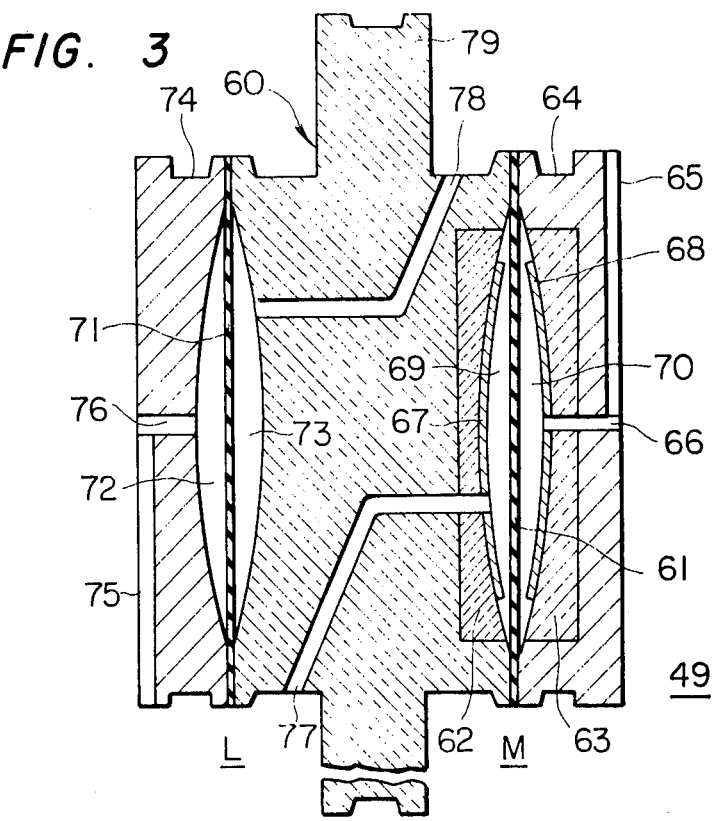
FIG. 3 shows a partial cross section thereof.

FIG. 2 shows a cross section of one preferred embodiment and FIG. 3 shows an enlarged partial cross section thereof. The embodiment shown in FIG. 2 comprises basically a differential pressure sensing block 40, a first cover 41 and a second cover 42. The first and second covers define first and second pressure chambers 43 and 44 respectively, into which a first fluid to be measured at a pressure of $P_1$ is introduced through an inlet 45 and a second fluid to be measured at a pressure of $P_2$ is introduced through an inlet 46. The fluids may be liquid or gas. The covers 41 and 42 are secured to the block 40 by means not shown. Reference numerals 47 and 48 denote O-rings.

The block 40 basically comprises a differential pressure transmission block 49, a first casing 50 and a second casing 51. The first and second casings 50 and 51 are respectively formed with first and second recesses 52 and 53, and are further provided with first and second pressure-receiving diaphragms 54 and 55, respectively, on the sides opposite to the recesses. The diaphragm 54 defines a first pressure-receiving chamber 56 in cooperation with the first casing 50, and receives the action of the pressure $P_1$ introduced into the first pressure chamber 43. Similarly, the diaphragm 55 defines a second pressure-receiving chamber 57 in cooperation with the second casing 51, and receives the action of the pressure $P_2$ introduced into the second pressure chamber 44. The first and second casings 50 and 51 are in face to face symmetry with each other, and are respectively provided with a first passage 58 that connects the first recess 52 with the first pressure-receiving chamber 56 and a second passage 59 that connects the second recess 53 with the second pressure-receiving chamber 57.

The differential pressure transmission block 49 comprises, as best shown in FIG. 3, an auxiliary chamber L and a measuring chamber M. The auxiliary chamber L is defined by a first housing 60 and a second housing 74 mounted to the left thereof, in which the opposing surfaces of the first and second housings are spherically concave. An auxiliary diaphragm 71 is disposed between the first and second housings, wherein the second housing 74 and the diaphragm 71 define a first auxiliary chamber 72, and the first housing 60 and the diaphragm 71 define a second auxiliary chamber 73. The second housing is formed with a first fluid channel 76 that connects the first passage 58 with the chamber 72, and with a channel 75 that connects an inner recess 80 to be described later with the channel 76. Similarly, the measuring chamber M is defined by the first housing 60 and a third housing 64 mounted to the right thereof. The opposing surfaces of the first and third housings are provided with recesses within which insulating members 62 and 63 of glass, ceramics or the like are mounted. The opposing surfaces of these insulating members are spherically concave, and metal foils 67 and 68 which serve as capacitor electrodes are deposited on these surfaces. A measuring diaphragm 61 is disposed between the housings 60 and 64, whereby the insulating member 62 and the diaphragm 61 define a first measuring chamber 69, and the insulating member 63 and the diaphragm define a second measuring chamber 70. The third housing 64 is formed with a second fluid channel 66 that connects the second passage 59 with the chamber 70, and with a channel 65 that connects the channel 66 with an inner recess 81 to be described later.

The first housing 60 is formed with a fluid channel 77 that connects the measuring chamber 69 with the inner recess 80, and with a fluid channel 78 that connects the auxiliary chamber 73 with the inner recess 81.

The auxiliary diaphragm 71 is composed of a material having less rigidity than that of the measuring diaphragm 61. Accordingly, when the auxiliary diaphragm and the measuring diaphragm are subjected to the same differential pressure, the auxiliary diaphragm exhibits greater displacement than the measuring diaphragm. If an excess differential pressure is applied to or occurs in the apparatus, the auxiliary diaphragm and the measuring diaphragm are displaced independently of each other to absorb fluid volumes corresponding to those in the first pressure-receiving chamber 56 and the second pressure-receiving chamber 57. In this embodiment, the diaphragm 54 or 55 abuts its adjacent casing 50 or 51 before the measuring diaphragm 61 abuts the insulating member 63 or 62 and, for this purpose, the rigidity of the auxiliary diaphragm 71 is selected such that most of the fluid from the chambers 56 or 57 can be internally absorbed by the displacement of the auxiliary diaphragm.

The first casing 50, flange 79 of the first housing 60, and the second casing 51 are sandwiched together to situate the auxiliary chamber L within the recess 52 of the first casing and the measuring chamber M within the recess 53 of the second casing, while leaving a peripheral recess 80 between the casing 50 and the auxiliary chamber L and a peripheral recess 81 between the second casing 51 and the measuring chamber M.

Figure 1:
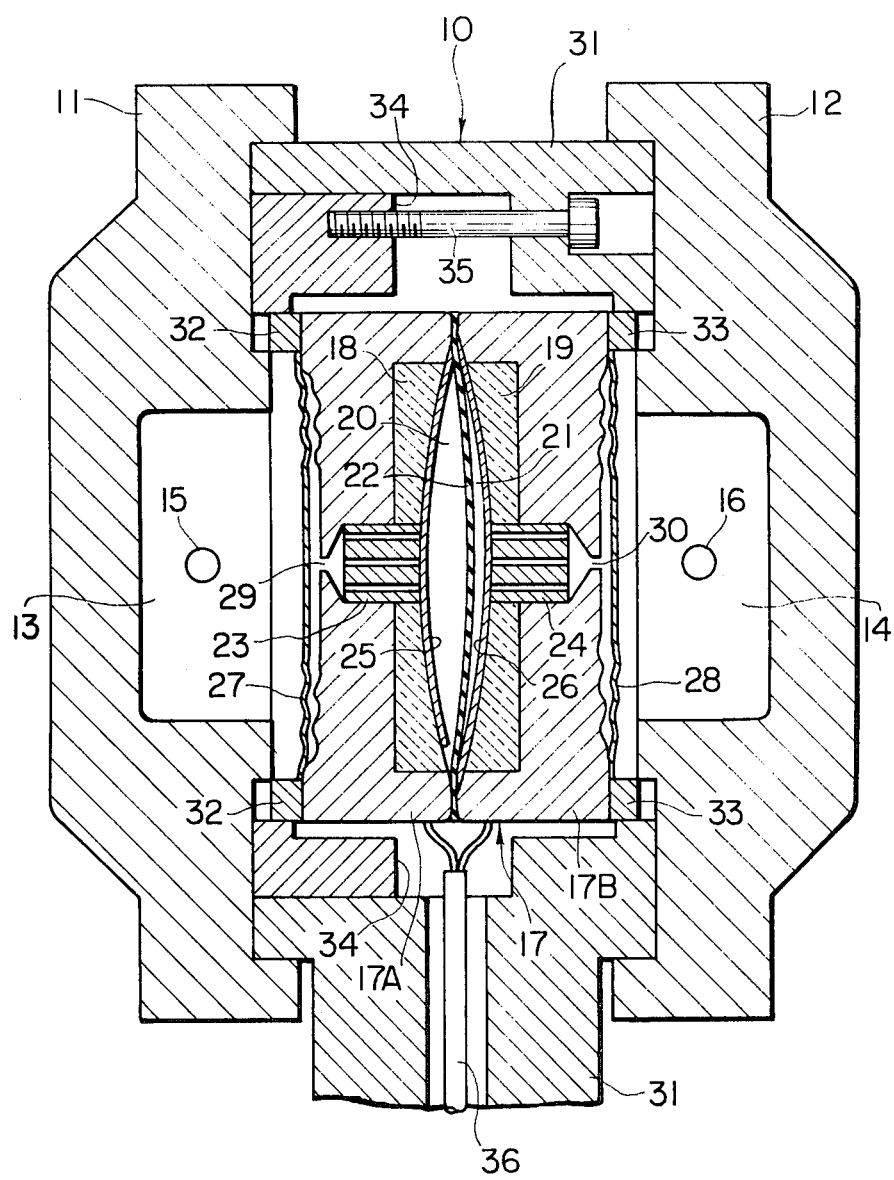
FIG. 1 shows a cross sectional view of a conventional apparatus for measuring differential pressure.

In operation, when the differential between the pressures $P_1$ and $P_2$ applied to the first and second chambers 43 and 44 lies within a predetermined range, the measuring diaphragm 61 serves as a movable electrode and the metal foils 67 and 68 serve as stationary electrodes, as in the apparatus shown in FIG. 1. The capacitance between them changes in proportion to the differential pressure, and is electrically read out through lead wires, not shown. If a conduit or the like for introducing a first fluid into the first chamber 43 is so destroyed, for instance, as to reduce the pressure $P_1$ in the chamber 43 to zero and render the relative pressure $P_2$ in the chamber 44 excessively high, then the diaphragm 55 closely contacts the casing 51 before the measuring diaphragm 61 abuts against the insulating member 62, and the auxiliary diaphragm 71 undergoes displacement independently of the measuring diaphragm 61 so that a volume of the sealed fluid substantially corresponding to that of the chamber 57 flows through the channel 65, recess 81 and channel 78 into the chamber 73. In a similar manner, if a conduit or the like for introducing a second fluid into the second chamber 44 is so destroyed as to reduce the pressure $P_2$ in the chamber 44 to zero and render the relative pressure $P_1$ in the chamber 43 excessively high, then the diaphragm 54 closely contacts the casing 50 before the measuring diaphragm 61 abuts against the insulating member 63, and the auxiliary diaphragm 71 undergoes displacement independently of the measuring diaphragm 61 so that a volume of sealed fluid substantially corresponding to that of the chamber 56 flows through the channel 76 into the chamber 72. Protection against such excess pressure is thus implemented by the diaphragm 54 or 55 in relation to the lesser rigidity of the auxiliary diaphragm 71. That is, the volumes of the fluids behind the diaphragms 54 and 55 are small enough so that they can be absorbed in the auxilliary chamber owing to the more flexible diaphragm 71 before the stiffer diaphragm 61 engages its cavity walls and becomes damaged thereby.

Figure 4:
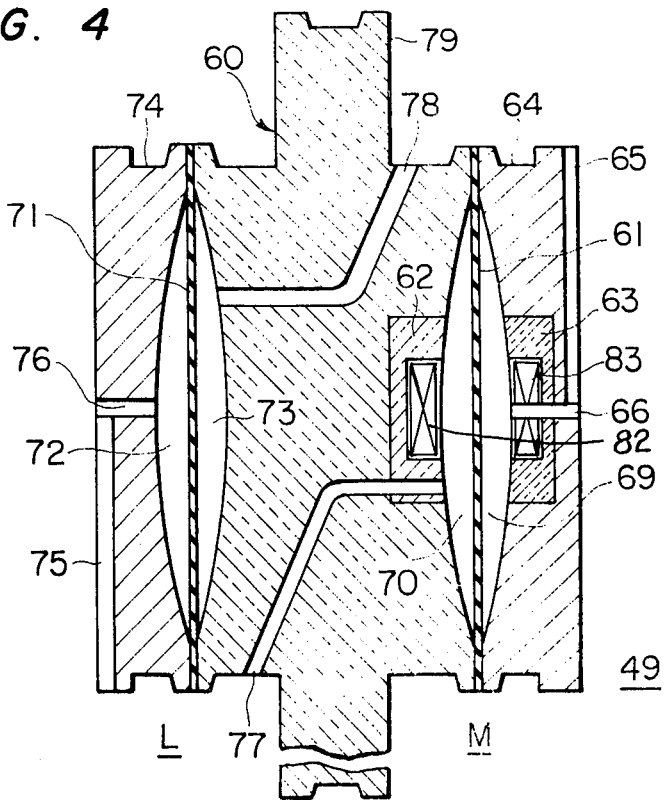
FIG. 4 shows a partial cross section of another preferred embodiment of this invention.

FIG. 4 shows a schematic partial cross section of another embodiment of this invention. Those parts or portions that have the same structures and functions as those illustrated in FIG. 3 bear the same reference numerals. In this embodiment, induction coils 82 and 83 are mounted, respectively, in the insulating members 62 and 63 for detecting displacements of the measuring diaphragm 61. The coils are connected in arms of an ac current measuring bridge, not shown. A metal of high magnetic permeability or a metal of low magnetic permeability may be used as the measuring diaphragm 61. When a metal of high permeability is used the displacement of the diaphragm 61 varies the effective resistance of the magnetic circuit including the induction coils 82 and 83, and when a metal of low permeability is used the diaphragm acts as a short-circuit coil wherein eddy currents developed in the diaphragm have a damping effect on the induction coils which brings about changes in their impedances.

According to this invention, since the measuring chamber M is securely mounted within the inner recess formed by the casings and substantially the same high static pressure is exerted both on the inside and the outer surface of the measuring chamber M, that is, a static pressure $P_1$ acts on the inner recess 81 and a static pressure $P_1$, $P_2$ acts on the inside of the measuring chamber M, said chamber does not undergo radial expansions and therefore no radial tension is exerted on the measuring diaphragm. Accordingly, no span changes occur as a function of different static pressures even when such pressures are very high.

In addition, excess pressure protection is provided by the close contact of the first and second pressure-receiving diaphragms to their respective casings together with the proper selection of the rigidity of the auxiliary diaphragm whereby permanent deformations to the measuring diaphragm are eliminated. Although the pressure-receiving diaphragms may be slightly deformed by their contact with the casings, such deformation does not cause measurement errors because the rigidity of these diaphragms is much lower than that of the measuring diaphragm.

What is claimed is:
1. A differential pressure sensing cell, comprising:
 a) a measuring chamber having electrically insulating walls,
 b) a measuring diaphragm mounted within the measuring chamber and dividing it into first and second closed chambers, c) measuring diaphragm displacement sensing elements mounted on the insulating walls,
d) an auxilliary chamber,
e) an auxilliary diaphragm mounted within the auxilliary chamber and dividing it into third and fourth closed chambers, the auxilliary diaphragm being more flexible than the measuring diaphragm,
f) casing means surrounding and mounting the measuring chamber and the auxilliary chamber, and defining a first recess surrounding the auxilliary chamber and a second recess surrounding the measuring chamber,
g) a first pressure-receiving diaphragm movably responsive to a first input pressure and mounted within the casing means to define a first pressure-receiving chamber,
h) a second pressure-receiving diaphragm movably responsive to a second input pressure and mounted within the casing means to define a second pressure-receiving chamber,
i) fluid sealed within and filling the measuring and auxilliary chambers, the first and second recesses, and the first and second pressure-receiving chambers,
j) first fluid passage means interconnecting the first pressure-receiving chamber, the first recess, and the first and third closed chambers, and
k) second fluid passage means interconnecting the second pressure-receiving chamber, the second recess, and the second and fourth closed chambers, whereby radial tension of the measuring diaphragm due to static differential pressure between the interior and exterior of the measuring chamber is minimized by substantially equalizing the interior and exterior pressures through said first and second fluid passage means, and over-pressure protection of the measuring diaphragm when the pressure differential between the first and second pressure-receiving chambers becomes too large as attained by causing the first or second pressure-receiving diaphragm to contact the casing before the measuring diaphragm contacts the casing before the measuring diaphragm contacts the casing while absorbing the change in volume of the first or second pressure-receiving chamber by the action of the auxilliary diaphragm through the first or second fluid passage means, respectively.

2. A differential pressure sensing cell as defined in claim 1 wherein the first and second recesses are generally ring-shaped and surround the auxilliary and measuring chambers, respectively, adjacent the outer peripheries of the auxilliary and measuring diaphragms.

3. A differential pressure sensing cell as defined in claim 2 wherein the measuring diaphragm, the auxilliary diaphragm, and the first and second pressure-receiving diaphragms are all coaxially positioned within the cell, and the first and second pressure-receiving diaphragms are positioned outwardly of the auxilliary and measuring diaphragms, respectively.

4. A differential pressure sensing cell as defined in claim 2 wherein the measuring and auxilliary chambers are spherically concave, and the measuring and auxilliary diaphragms are centrally mounted in their respective chambers, whereby the first and second closed chambers and the third and fourth closed chambers are symmetrical and equal in volume, respectively.

5. A differential pressure sensing cell as defined in claim 3 wherein the measuring and auxilliary chambers are spherically concave, and the measuring and auxilliary diaphragms are centrally mounted in their respective chambers, whereby the first and second closed chambers and the third and fourth closed chambers are symmetrical and equal in volume, respectively.

6. A differential pressure sensing cell as defined in claim 1 wherein the measuring diaphragm, the auxilliary diaphragm, and the first and second pressure-receiving diaphragms are all coaxially positioned within the cell, and the first and second pressure-receiving diaphragms are positioned outwardly of the auxilliary and measuring diaphragms, respectively.

7. A differential pressure sensing cell as defined in claim 6 wherein the measuring and auxilliary chambers are spherically concave, and the measuring and auxilliary diaphragms are centrally mounted in their respective chambers, whereby the first and second closed chambers and the third and fourth closed chambers are symmetrical and equal in volume, respectively.

8. A differential pressure sensing cell as defined in claim 1 wherein the measuring and auxilliary chambers are spherically concave, and the measuring and auxilliary diaphragms are centrally mounted in their respective chambers, whereby the first and second closed chambers and the third and fourth closed chambers are symmetrical and equal in volume, respectively.

* * * * *